US012747816B2

(12) United States Patent
Larson et al.

(10) Patent No.: US 12,747,816 B2
(45) Date of Patent: Sep. 29, 2026

(54) HYDRAULIC FITTING WITH INTERNAL GRIP

(71) Applicant: Mueller International, LLC, Atlanta, GA (US)

(72) Inventors: Ryan Fairchild Larson, Decatur, IL (US); David Latimore Hughes, Jr., Signal Mountain, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 18/977,598

(22) Filed: Dec. 11, 2024

(65) Prior Publication Data

US 2026/0160371 A1 Jun. 11, 2026

(51) Int. Cl.
*F16L 37/62* (2006.01)

(52) U.S. Cl.
CPC .................................... *F16L 37/62* (2013.01)

(58) Field of Classification Search
CPC . F16L 37/62; F16L 17/00; F16L 33/16; F16L 37/06
See application file for complete search history.

(56) References Cited

U.S. PATENT DOCUMENTS 1,898,623 A * 2/1933 Gammeter .............. F16L 17/10 285/104
2,508,914 A * 5/1950 Graham .................. F16L 37/52 285/179
3,429,587 A * 2/1969 Kish ....................... F16L 17/10 285/94
3,486,777 A * 12/1969 Bird .......................... F16B 2/08 248/407
3,733,093 A 5/1973 Seiler
3,843,167 A * 10/1974 Gronstedt ............. F16L 37/002 285/123.6
3,860,270 A * 1/1975 Arnold .................... F16L 17/10 277/625
3,915,480 A * 10/1975 Kish ....................... F16L 21/08 285/369
3,999,782 A 12/1976 Shotbolt et al.
4,466,640 A * 8/1984 Van Houtte ............. F16L 17/10 285/104

(Continued)

FOREIGN PATENT DOCUMENTS

DE 29724671 11/2002
EP 0870967 10/1998

(Continued)

OTHER PUBLICATIONS

Larson, Ryan Fairchild; Requirement for Restriction/Election for U.S. Appl. No. 18/922,536, filed Oct. 22, 2024, mailed Oct. 14, 2025, 8 pgs.

(Continued)

*Primary Examiner* — Matthew Troutman
*Assistant Examiner* — James A Linford
(74) *Attorney, Agent, or Firm* — Smith, Gambrell & Russell, LLC

(57) ABSTRACT

A fitting for use with a pipe of variant size and pipe of variant angles can include a housing with a truncated cone, an inflatable conduit housed within the housing that can transition between a deflated and inflated state, and a grip located within the truncated cone of the housing. The fitting can include a gasket.

14 Claims, 9 Drawing Sheets

(56) References Cited

U.S. PATENT DOCUMENTS

| | | | | | |
|---|---|---|---|---|---|
| 4,786,087 | A * | 11/1988 | Thewlis | F16L 37/62 | 285/288.7 |
| 5,160,175 | A * | 11/1992 | Yang | F16L 37/12 | 285/104 |
| 5,335,946 | A | 8/1994 | Dent et al. | | |
| 6,447,018 | B1 * | 9/2002 | Ball | F16L 37/62 | 285/96 |
| 7,004,511 | B2 | 2/2006 | Barron et al. | | |
| 7,063,356 | B2 * | 6/2006 | Barker | F16L 37/62 | 285/96 |
| 7,552,949 | B2 | 6/2009 | Riordan, III et al. | | |
| 11,566,732 | B2 | 1/2023 | Furcoiu et al. | | |
| 12,595,866 | B1 | 4/2026 | Larson et al. | | |
| 12,644,547 | B1 | 6/2026 | Larson et al. | | |
| 2010/0148489 | A1 | 6/2010 | Pohn et al. | | |
| 2024/0117905 | A1 | 4/2024 | Huddleston | | |
| 2026/0110381 | A1 | 4/2026 | Larson et al. | | |

FOREIGN PATENT DOCUMENTS

| | | | |
|---|---|---|---|
| KR | 20100046355 | A | 5/2010 |
| KR | 20110127476 | A | 11/2011 |
| KR | 20190053647 | | 5/2019 |

OTHER PUBLICATIONS

Larson, Ryan Fairchild; Non-Final Office Action for U.S. Appl. No. 18/981,036, filed Jan. 9, 2025, mailed Sep. 18, 2025, 12 pgs.
Larson, Ryan Fairchild; Non-Final Office Action for U.S. Appl. No. 18/953,870, filed Nov. 20, 2024, mailed Aug. 15, 2025, 16 pgs.
Larson, Ryan Fairchild; Notice of Allowance for U.S. Appl. No. 18/953,870, filed Nov. 20, 2024, mailed Dec. 3, 2025, 11 pgs.
Larson, Ryan Fairchild; Non-Final Office Action for U.S. Appl. No. 18/922,536, filed Oct. 22, 2024, mailed Jan. 30, 2026, 27 pgs.
Larson, Ryan Fairchild; Notice of Allowance for U.S. Appl. No. 18/981,036, filed Jan. 9, 2025, mailed Feb. 2, 2026, 11 pgs.

* cited by examiner

HYDRAULIC FITTING WITH INTERNAL GRIP

TECHNICAL FIELD

This disclosure introduces a novel hydraulically activated fitting with an internal sealing and gripping mechanism. Specifically, an inflatable hydraulic fitting provides a solution in the field of pipe fittings and water distribution systems.

BACKGROUND

Traditional pipe fittings, while crucial in water distribution systems, present significant challenges. They often rely on mechanical components like saddles, bolts, and clamps, which can be complex to install and maintain. Previous approaches to pipe fittings have typically used traditional rubber gaskets or other materials requiring manual adjustment and tightening to ensure a secure seal. Conventional gaskets often rely on mechanical compression to create a seal between components, which can be time-consuming and labor-intensive. Additionally, the effectiveness of these gaskets may be compromised over time, leading to leaks and potential maintenance issues.

Moreover, the incorporation of grips within pipe fittings has been explored to facilitate the installation processes. Conventional grip designs may not fully optimize the ergonomic and functional aspects of the pipe fitting, which can lead to inefficiencies in operation and maintenance. Challenges with installing and maintaining pipe fittings include ensuring a consistent and reliable seal, particularly under varying pressure conditions. Many fittings require multiple bolts, which in some fittings must be tightened in a specific sequence to achieve an even seal, adding to the labor and time required for installation. Moreover, these systems can be prone to leaks or seal failures if not installed correctly, necessitating frequent maintenance and inspections.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a fitting including a housing with a truncated cone, an inflatable conduit within the housing, the inflatable conduit configurable between a deflated configuration and an inflated configuration, and a grip within the truncated cone of the housing.

In a further aspect, disclosed is a fitting assembly including a pipe defining an outer surface; and a fitting defining: a housing including a truncated cone; an inflatable conduit within the housing, the inflatable conduit configurable between a deflated configuration and an inflated configuration; and a grip captured within the truncated cone of the housing and the outer surface of the pipe.

In yet another aspect, disclosed is a method including inserting a pipe into the mouth of a fitting and inflating an inflatable conduit within the fitting to move a grip down a truncated cone defined by a housing of the fitting to exert a normal force on the pipe.

Various implementations described in the present disclosure may comprise additional systems, methods, features, and advantages, which may not necessarily be expressly disclosed herein but will be apparent to one of ordinary skill in the art upon examination of the following detailed description and accompanying drawings. All such systems, methods, features, and advantages are intended to be included within the present disclosure and protected by the accompanying claims. The features and advantages of such implementations may be realized and obtained using the systems, methods, and features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

When securing pipes, especially in challenging environments, traditional fittings often struggle with maintaining a tight, leak-proof connection, particularly when faced with high-pressure conditions and flexible materials. An innovative hydraulic fitting solution described below addresses these challenges by integrating an inflatable conduit that pushes and forces grips outward. The hydraulic fitting can receive a compressible fluid or gas (e.g., compressed air) or an incompressible fluid, such as oil or water. As the grips are forced outward, a sloped housing incrementally forces them downwards. This configuration can ensure the grip secures a firm and reliable hold on the pipe, even if the hydraulic fitting later bursts or loses pressure. Unlike conventional fittings, the described hydraulic design can eliminate the need for an insert stiffener. The hydraulic fitting installation process can push the grip and seals from the center of the fitting, making the installation simpler and more efficient than a mechanism that pulls the seal and grip.

Monolithic cast housing and dual truncated cones can also work with the hydraulic system to create a secure, fluid-tight seal on different pipes comprising different schedules and materials, even under demanding conditions. The hydraulic fitting described thus can offer unparalleled stability and performance, whether working with a single pipe, a coupling, a T-fitting, or a Y-split configuration. Inflatable hydraulic fittings can push the seal and/or gripping mechanism to ensure that connections in the system are robust and reliable.

Figure 1:
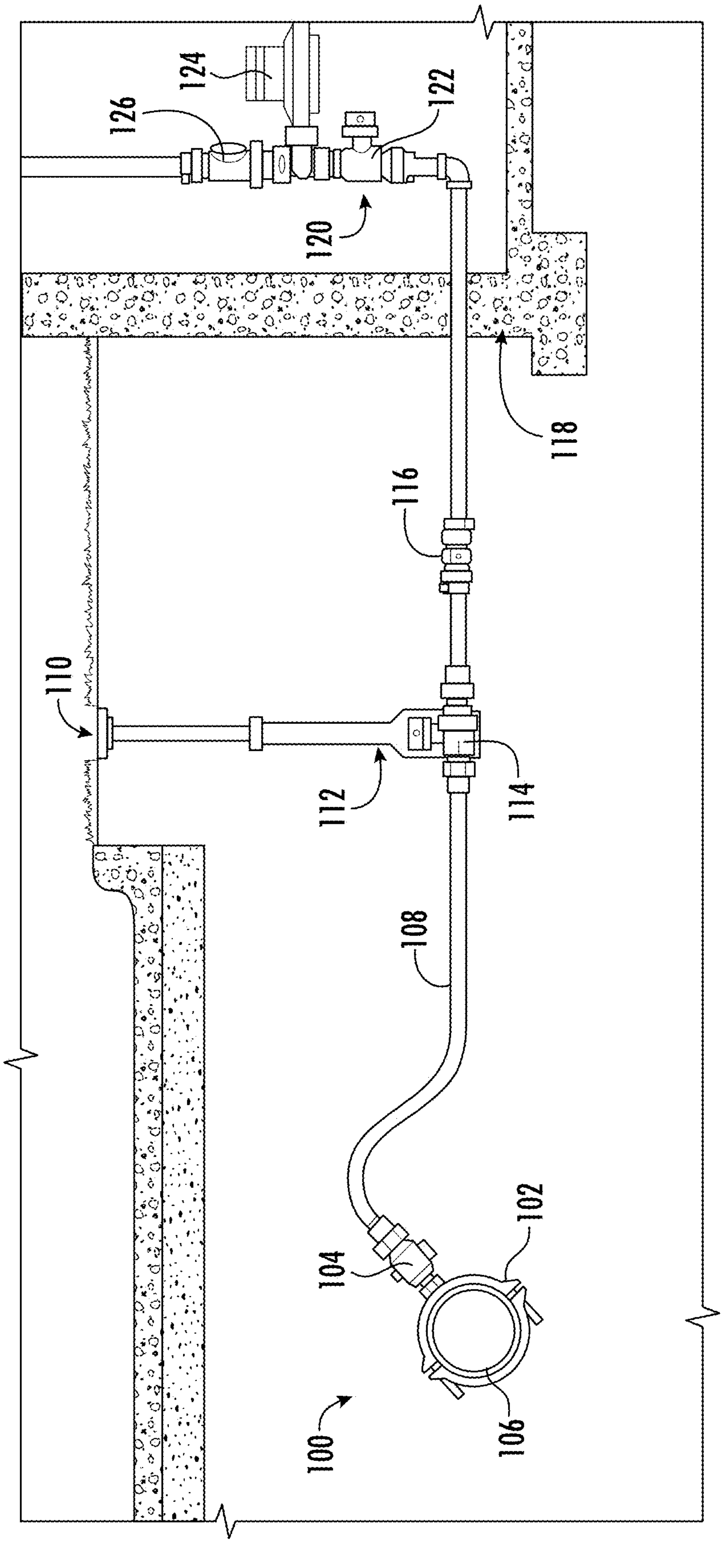
FIG. 1 (PRIOR ART)
FIG. 1 is a schematic perspective view of a prior art saddle water service lateral with a service saddle corporation stop used to tap a water utility main, in accordance with one aspect of the current disclosure.

FIG. 1 shows an exemplary prior art schematic of a water service lateral assembly 100. The assembly 100 can comprise a service saddle, referred to as a corporation ("corp") stop or corp stop 102. Corp stop 102 can support a tap valve assembly 104 that can provide a lateral service to tap a water utility main 106 and provide a building (e.g., a residence or a business) water service. Tap valve assembly 104 can extend from the corp stop 102 to the building (or a valve servicing the building) through a service line 108.

For example, service line 108 can comprise a curb stop 110 with a pit assembly 112 configured to access a utility valve 114. Curb stop 110 can receive a tool extending through the pit assembly 112 to operate utility valve 114. Service line 108 can comprise a service fitting 116 within the pit assembly 112. Service fitting 116 can be located in pit assembly 112. Service fitting 116 and/or pit assembly 112 can be between corp stop 102 and a building foundation 118. When the utility service line 108 enters the building, various meter assemblies 120 can be used to ensure that the service line 108 can be serviced, monitored, and/or maintained. For example, an entrance valve 122, a meter 124, and/or an inline dual check valve 126 can be used to service, maintain, and/or provide utility service to the building.

As described below, various components of conventional water service lateral assembly 100 can comprise various hydraulic pipe fittings 200 (FIG. 2) to create a fluid-tight seal. For example, and without limitation, corp stop 102, tap valve assembly 104, service line 108, utility valve 114, service fitting 116, entrance valve 122, meter 124, and/or inline dual check valve 126 can utilize one or more inflatable hydraulic fittings (referred to herein as hydraulic pipe fittings 200 comprising an inflatable conduit 300, shown in FIGS. 2 and 4, respectively). Illustrated in FIG. 2, hydraulic pipe fitting 200 can create a water-tight seal when used in water service lateral assembly 100. Hydraulic pipe fitting 200 can create a fluid-tight seal when used for other fluids.

As used herein, "hydraulic" can be a mechanism operated by a liquid moving in a confined space under a pressure differential. Inflatable can refer to an object capable of being filled with fluid to change the object's internal pressure and/or exterior shape. For example, an uninflated conduit can define an internal pressure or exterior shape different from an inflated conduit.

Figure 2A:
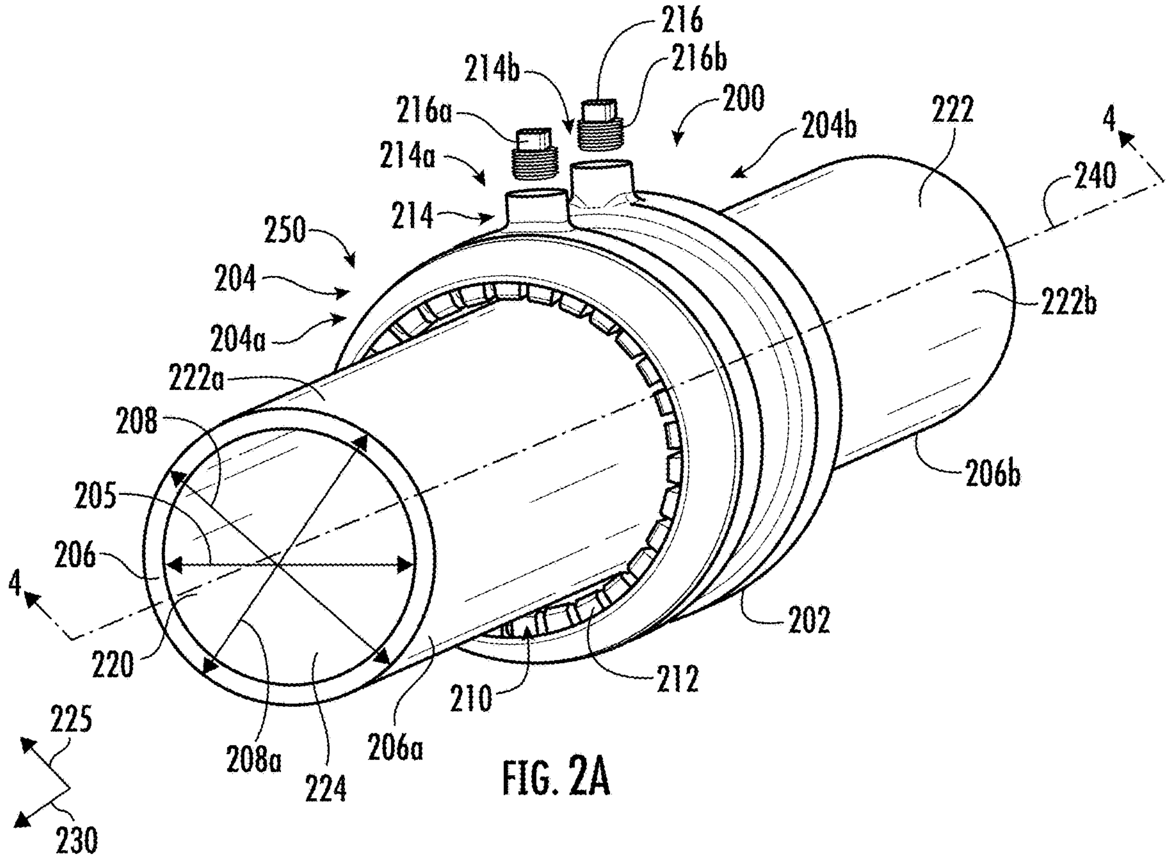
FIG. 2A is a perspective view of a hydraulic fitting prior to inflation, in accordance with one aspect of the current disclosure.
Figure 2B:
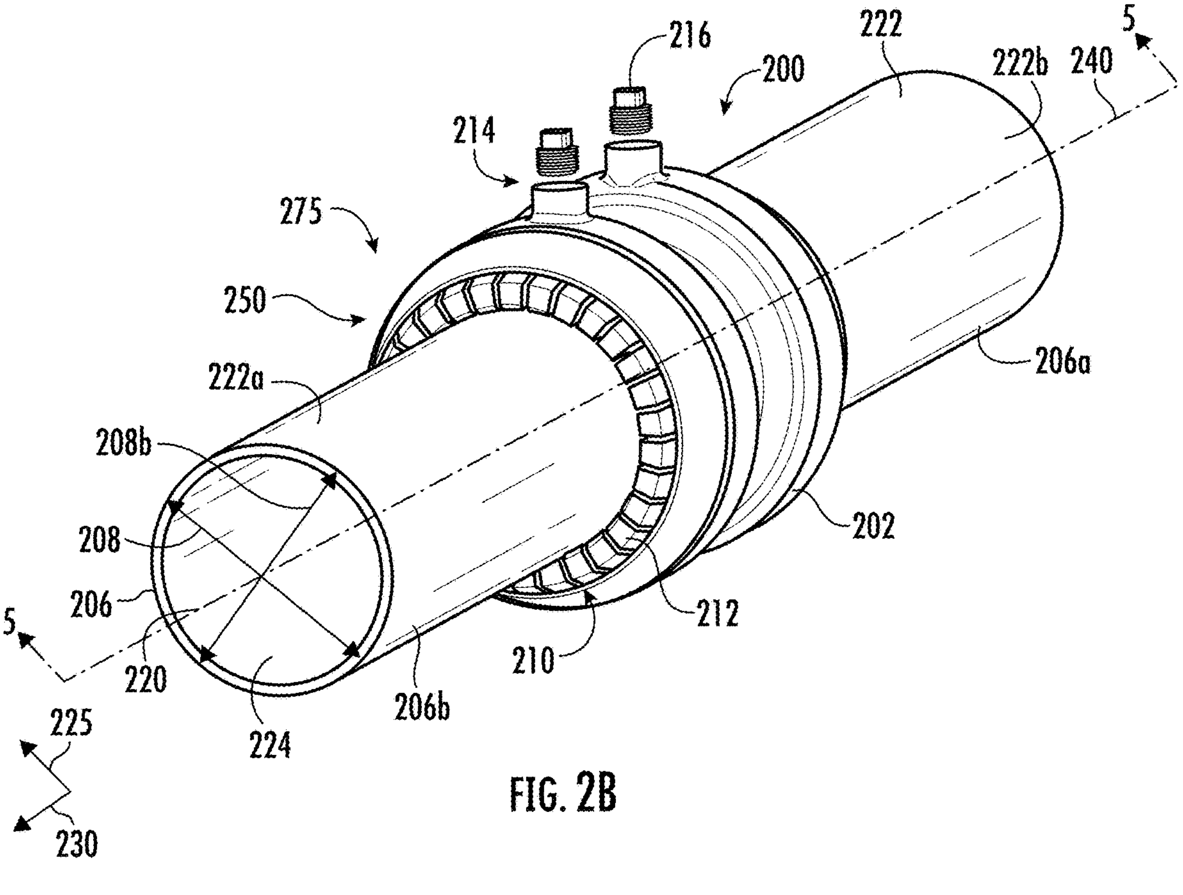
FIG. 2B is a perspective view of the hydraulic fitting of FIG. 2A post-inflation.

FIG. 2A is a perspective view of the hydraulic pipe fitting 200 before inflation, e.g., in a deflated configuration 250. Similarly, FIG. 2B is a perspective view of the hydraulic pipe fitting 200 of FIG. 2A post-inflation, e.g., in an inflated configuration 275. Concerning FIGS. 2A and 2B, hydraulic pipe fitting 200 can comprise a housing 202 configured to receive a pipe 206. Specifically, housing 202 can receive an outer surface 222 of pipe 206.

Housing 202 can be a monolithic cast (e.g., die-cast) structure in various aspects. Housing 202 can be of a forged (e.g., die-forged) structure in various aspects. Various other forming methods can be utilized in various aspects, including machining, sand casting, investment casting, forging, welding, braising, or various combinations of such methods as would be known in the art. Housing 202 can define opposing ends 204. For example, housing 202 can extend between a first end 204*a* and a second end 204*b* opposite the first end 204*a*. In various aspects, housing 202 can be configured to receive a variety of different types of pipes 206, each defining a different outer diameter 208 of the outer surface 222, respectively. Housing 202 can define a radial direction 225 transverse to the central axis 240 and an axial direction 230 parallel and/or colinear with the central axis 240.

Hydraulic pipe fitting 200 can align two or more pipes 206 along a central axis 240 of the housing 202 and/or hydraulic pipe fitting 200. For example, pipe 206 can be arranged on the first end 204*a* and can be a metal pipe 206*a*, defining a first outer diameter 208*a* and a first outer surface 222*a*. Pipe 206*b* can be arranged on the second end 204*b* can be a high-density polyethylene (HDPE) pipe 206*b*, defining a second outer diameter 208*b* and a second outer surface 222*b*. Hydraulic pipe fitting 200 can join other piping materials, but these two exemplary materials can illustrate the ability of hydraulic pipe fitting 200 to join pipes 206 comprising different material properties. In various aspects, pipe 206 can be made of materials including cast iron, ductile iron, steel, stainless steel, HDPE, brass, copper, and various other materials known in the art. As known in the art, the variant materials listed above can comprise variant actual outer diameters for pipe sizing, even if such pipe sizing is nominally the same. For example, "six-inch" pipe 206 made from ductile iron can be of a different diameter than "six-inch" pipe 206 made from iron or steel. As such, in various aspects, the first outer diameter 208*a* can differ from the second outer diameter 208*b* even when the same nominal pipe size (e.g., two or more pipes 206 with the same inner diameters) is used.

Pipes 206 with the same inner diameter defining an inner pipe surface 220 can have different schedules. The inner pipe surface 220 can be located opposite the outer pipe surface 222 defined by the outer diameter 208 of pipe 206. Thus, two pipes with the same inner diameter 205 can have different outer diameters 208 because each pipe 206 comprises a different schedule and/or material. Stated differently, the schedule or thickness of pipe 206 can be defined between inner pipe surface 220 and the outer diameter 208 of pipe 206. The pipe 206 can be defined by the inner diameter 205 of an interior 224.

Hydraulic pipe fitting 200 can facilitate joining two different pipes (e.g., metal pipe 206*a* and HDPE pipe 206*b*) with one or more different schedules, materials, outer surfaces 222, and/or outer diameters 208 (e.g., first outer diameter 208*a* and second outer diameter 208*b*).

Figure 3:
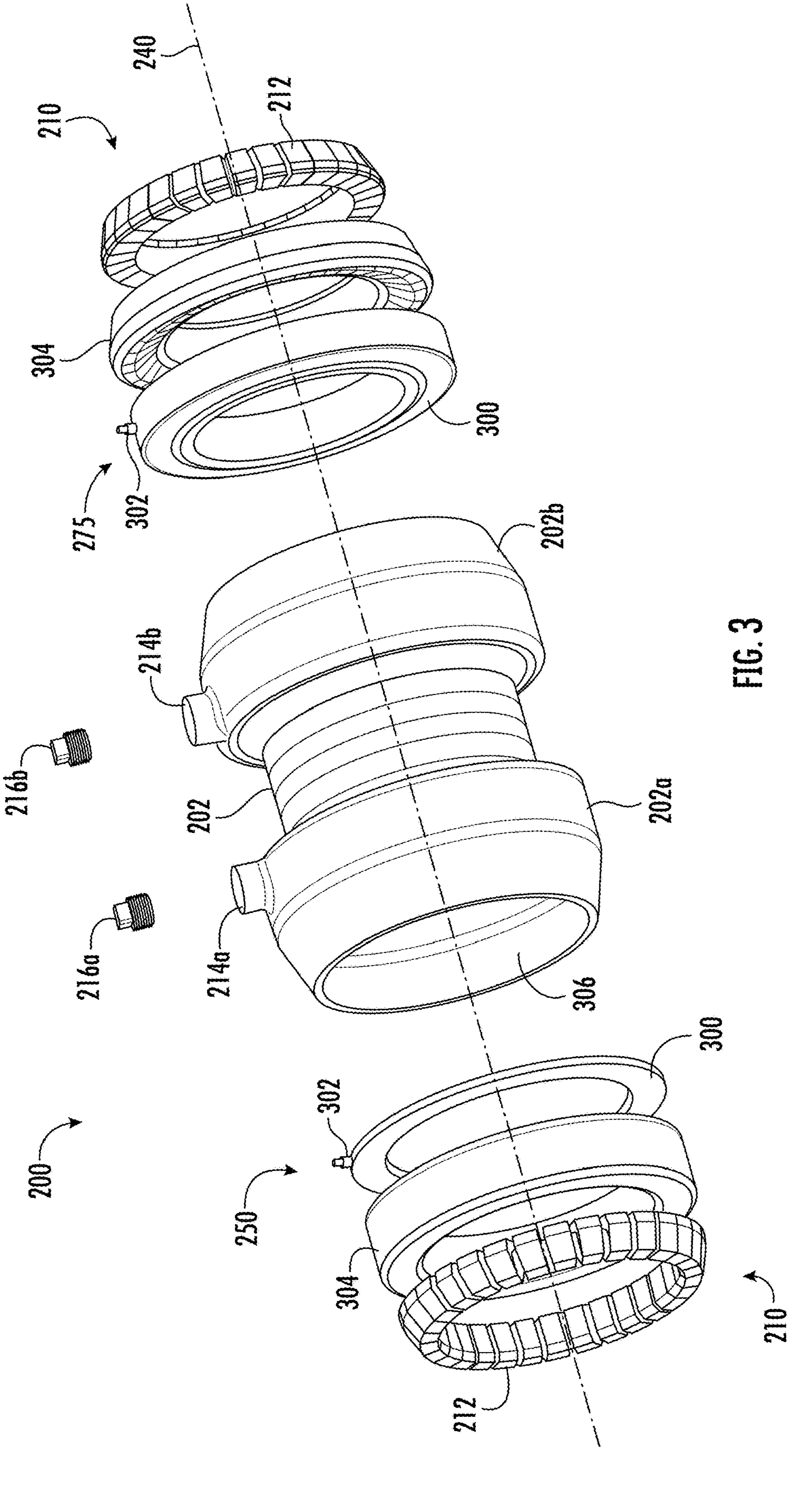
FIG. 3 is an exploded view of the hydraulic fitting with the pipes removed.

A grip mechanism 210 can comprise one or more grips 212. In various aspects, grip mechanism 210 is absent from hydraulic pipe fitting 200 (e.g., no grip mechanism 210 is present in the hydraulic pipe fitting 200) and/or grip mechanism 210 can be integral and/or monolithically formed with gasket 304 (FIG. 3). In some aspects, the grip mechanism 210 can be removed due to other constraints such as the ground, or can be integrally formed, e.g., as a monolithic piece with the gasket 304 shown in FIG. 3.

As the hydraulic pipe fitting 200 expands from the deflated configuration 250 to the inflated configuration 275, grips 212 can be moved to enable grip mechanism 210 to compress grips 212 against pipe 206. Collectively, the collection of grips 212 in grip mechanism 210 can hold pipe 206 relative to hydraulic pipe fitting 200.

Figure 4:
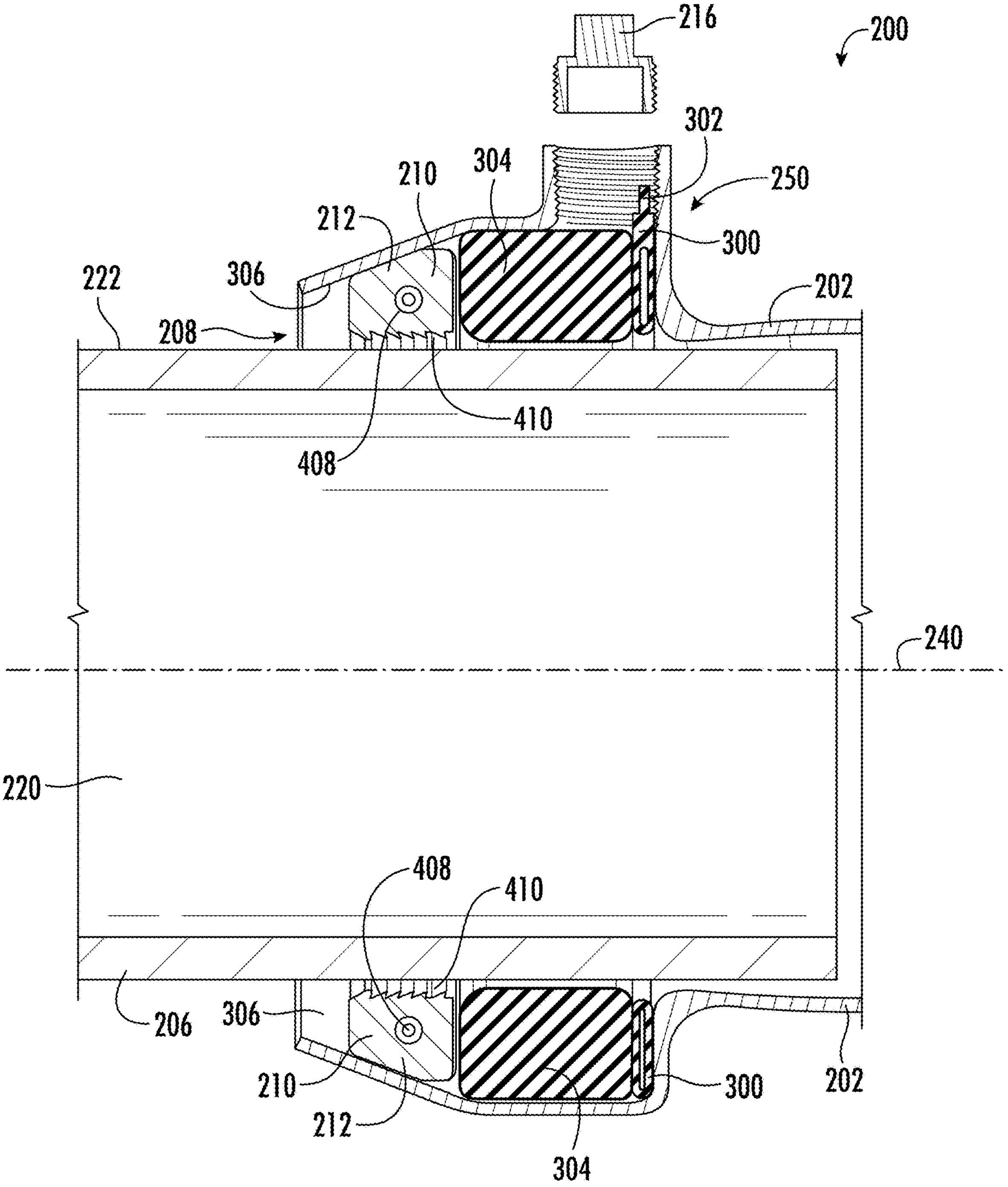
FIG. 4 is a cross-sectional view of the hydraulic fitting of FIG. 2, prior to inflation, taken along line 4-4.

In various aspects, grip mechanism 210 can be a single body; in various aspects, a plurality of grips 212 can be connected in an assembly of grips 212 to form grip mechanism 210. For example, as shown in FIG. 4, grip mechanism 210 can couple a plurality of grips 212 with a cable 408. FIGS. 4 and 5 show the alignment of two different sizes of pipe 206 within housing 202. Different schedules of two different pipes, 206*a* and 206*b*, can be joined along the housing 202 central axis 240 in the hydraulic pipe fitting 200.

One hydraulic pipe fitting 200 can comprise a plurality of valve assemblies 214 (e.g., one or more valve assemblies 214 in a single hydraulic pipe fitting 200). Each valve assembly 214 can comprise an inflatable conduit 300 (FIG. 3), gasket 304 (FIG. 3), and grip mechanism 210. An inflation valve 302 of the inflatable conduit 300 can be accessible through valve cap 216. Valve assembly 214 can be a monolithic piece, or various components can be combined. For example, the inflatable conduit 300 and gasket 304 can be a one-piece monolithic component. Similarly, the inflatable conduit 300, gasket 304, and/or grip mechanism 210 can be combined into a one-piece monolithic component. Other aspects of the gasket 304 and grip mechanism 210 are discussed in U.S. patent application Ser. No. 18/922,536 filed on Oct. 22, 2024 and titled "Widge Range Gland for Mechanical Joint," which is incorporated herein by reference in its entirety. The illustrated hydraulic pipe fitting 200 can comprise a first inflation valve assembly 214*a* comprising a first valve cap 216*a* and a second inflation valve assembly 214*b* comprising a second valve cap 216*b*. The inflatable/hydraulic design of the fitting facilitates an inflatable hydraulic pipe fitting 200.

Hydraulic pipe fitting 200 can simplify the installation process, reduce the need for specialized tools, and/or provide a robust and reliable self-sealing mechanism, e.g., for various outer diameters and/or pipes 206. The hydraulic pipe fitting 200 can comprise a wide-mouth opening 610 (FIG. 6), defining various insertion angles of pipe 206. The wide-mouth opening 610 can facilitate the installation of hydraulic pipe fitting 200 over a range of pipe sizes and/or pipes 206 comprising different materials and at different angles. In this way, hydraulic pipe fitting 200 can offer enhanced durability to the system under various pressure conditions and/or be more accessible and safer to install. Due to the ability to receive different pipes 206 and/or outer diameters 208, the hydraulic pipe fitting 200 can reduce labor costs and/or improve overall system reliability.

FIG. 3 shows an exploded view of the valve assembly 214 in the hydraulic pipe fitting 200. Valve assembly 214 can have an inflatable conduit 300 in a deflated configuration 250 and an inflated configuration 275. Specifically, on the left side of the figure, inflatable conduit 300 can be in the deflated configuration 250 and can comprise inflation valve 302 configured to be oriented within valve cap 216. On the right side of FIG. 3, inflatable conduit 300 can be in the inflated configuration 275. In this configuration, inflatable conduit 300 can move in the axial direction 230 along the central axis 240 and can push against gasket 304. When valve assembly 214 is in housing 202 and inflated conduit 300 is inflated (e.g., moved from the deflated configuration 250 to the inflated configuration 275), the gasket 304 can move within housing 202, and the truncated cone 306 can compress the gasket 304 against the outer surface 222 of pipe 206.

As shown in FIG. 3, the uninflated inflatable conduit 300 (on the left side of FIG. 3) can be fluidly connected to the inflated inflatable conduit 300 (e.g., on the right side of FIG. 3). In this way, the inflatable conduits 300 can be fluidly connected such that one fill point can be used to inflate both inflatable conduits 300. For example, in some aspects, the hydraulic pipe fitting 200 could omit a second port (e.g., a second inflatable valve 302) in the other (second) side of the inflatable conduit 300. In some aspects, the inflatable conduit 300 can be on a coupling that couples to both inflatable valves 302 and ports fluid to both sides of the housing 202. In some aspects, a conduit, such as a tube could extend between the two or more inflatable valves 302 and fill two or more respective inflatable conduits 300 together.

The hydraulic pipe fitting 200 in FIG. 4 is shown in the deflated configuration 250, e.g., before inflation. In deflated configuration 250, an inflatable conduit 300 comprising an inflation valve 302 can be located within housing 202. The inflatable conduit 300 can be disposed in housing 202 and configurable between the deflated configuration 250 and the inflated configuration 275 (FIGS. 3 and 5). A gasket 304 (e.g., comprising rubber and/or another solid sealing material) can comprise a compressible and/or deformable material between the inflatable conduit 300 and the grip 212. For example, gasket 304 can be interposed between inflatable conduit 300 and grip mechanism 210. Gasket 304 can function to move each grip 212 when inflatable conduit 300 is inflated from deflated configuration 250 to inflated configuration 275. The inflation of inflatable conduit 300 can cause grip 212 to move in housing 202 to compress against pipe 206 and gasket 304 to form a fluid-tight seal.

Regarding FIGS. 4 and 5, the grip mechanism 210 can be engaged by moving one or more grips 212 on a grip mechanism 210. In the deflated configuration 250, grip 212 can be stored between a bend 502 in housing 202 and a truncated cone 306 in housing 202. The grip 212 can be stored in contact with the truncated cone 306. When the inflatable conduit 300 is inflated, the gasket 304 and grip 212 on grip mechanism 210 can move in response. Housing 202 can be conical, frustoconical, annular, and/or bowl-shaped.

Housing 202 can define a flat internal slope, e.g., the truncated cone 306, configured to compress the grips 212 under the flat internal slope. Housing 202 can be annular, and the truncated cone 306 can be tapered to form a frustoconical annular cavity that can define an annular tapered sloped surface. The truncated cone 306 can be tapered inward towards the central axis 240. When grip 212 of grip mechanism 210 moves axially, the truncated cone 306 can compress grip 212 against the inserted pipe 206. Bend 502 can provide a boundary against the inflatable conduit 300 to support the inflatable conduit 300 in pushing the gasket 304 and grip 212 when inflated and moving the grip mechanism 210 axially along the internal slope 406, e.g., away from bend 502. Truncated cone 306 can compress grips 212 of grip mechanism 210 as inflatable conduit 300 is inflated to push and move grip 212 outward from bend 502.

Cable 408 can couple various grips 212 to form grip mechanism 210. Cable 408 can extend through each grip 212 to form a chain of grips 212. The chain of grips 212 can cause compression of grip mechanism 210 against the outer surface 222 of pipe 206. In other aspects, grip mechanism 210 can be monolithic, as discussed previously.

As illustrated, grip 212 and/or grip mechanism 210 can comprise teeth 410 configured to grip pipe 206. When inflatable conduit 300 is inflated (e.g., pressurized from the deflated configuration 250 to the inflated configuration 275), grip 212 can be compressed against truncated cone 306. Grip 212 can move to form a normal force against pipe 206. The grips 212 of grip mechanism 210 can clamp down on the outer surface 222 of pipe 206. The gripping normal force F can be proportional and transverse (orthogonal) to the gripping frictional force (e.g., set force) generated at teeth 410 between gripping mechanism 210 and pipe 206. For example, a gripping frictional force defined by the grip mechanism 210 in the deflated configuration 250 can be less than the gripping frictional force defined by grip mechanism 210 when the inflatable conduit 300 can be in the inflated configuration 275, and housing 202 compresses grip 212 of grip mechanism 210.

Figure 5A:
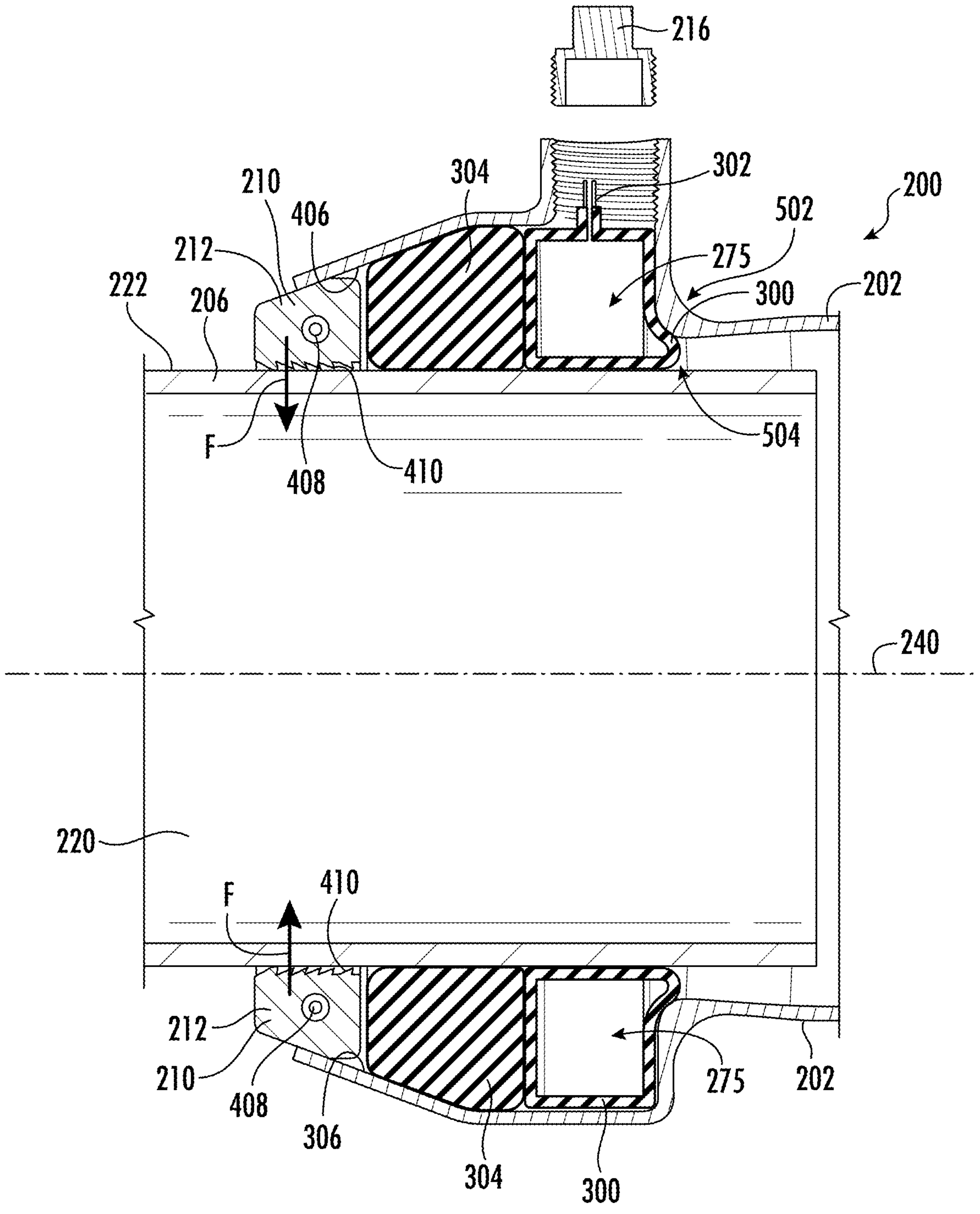
FIG. 5A is a cross-sectional view of the hydraulic fitting of FIG. 3, post-inflation, taken along line 5-5.

FIG. 5A is a cross-sectional view of the hydraulic fitting of FIG. 3, post-inflation, e.g., in the inflated configuration 275. A pump can be coupled to inflation valve 302 and can inflate inflatable conduit 300. The inflated configuration 275 of inflatable conduit 300 can compress gasket 304. Similarly, gasket 304 can compress into pipe 206 and can force the teeth 410 of grips 212 of grip mechanism 210 against pipe 206. Compressed grips 212 of gripping mechanism 210 can extend axially somewhat beyond the housing 202 of hydraulic pipe fitting 200.

Gripping mechanism 210 can be compressed in the radial direction 225 (FIG. 2) against pipe 206. For example, when gripping mechanism 210 is moved (e.g., by inflating inflatable conduit 300 into the inflated configuration 275) in the axial direction 230, the truncated cone 306 can compress the gripping mechanism 210 in the radial direction 225. As the inflatable conduit 300 expands, the gasket 304 and/or grip 212 can be pushed in the axial direction 230 and can be compressed in the radial direction 225.

Housing 202 can push gasket 304 and one or more compression grips 212 of grip mechanism 210 into a compressed position that can securely hold pipe 206 relative to housing 202. Similarly, gasket 304 can be moved to form a fluid-tight seal between the outer surface 222 of pipe 206 and the truncated cone 306 of housing 202.

The pressurization of inflatable conduit 300 can move gasket 304 and grip mechanism 210 to generate normal forces F on each. For example, the normal force F on gasket 304 can be caused by pressurization of the inflatable conduit 300 to move gasket 304 in the radial direction 225 and to compress gasket 304 in the radial direction 230 as gasket 304 moves through the truncated cone 306 of housing 202. Similarly, the pressurization of inflatable conduit 300 can move the gripping mechanism 210 in the axial direction 230, and the truncated cone 306 can compress grips 212 of the gripping mechanism 210 to generate a normal force F. The normal force F of the gripping mechanism 210 can be proportional and transverse to the gripping frictional force (e.g., set force) generated on the outer surface 222 of pipe 206. A seal can be formed between gasket 304 and the outer surface 222 when gasket 304 is moved first in the axial direction 230 and compressed and/or deformed in the radial direction 225. For example, when grip mechanism 210 is captured between the truncated cone 306 of housing 202 and the outer surface 222 of pipe 206, a grip set force transverse to the normal force can be defined. The gasket 304 can also be compressed between the truncated cone 306 and the outer surface 222 of pipe 206 to form a fluid-tight seal.

The bend 502 in housing 202 of hydraulic pipe fitting 200 can support inflatable conduit 300 in the inflated configuration 275 to expand and move gasket 304 in the axial direction 230 and to compress the gasket 304 in the radial direction 225 (FIG. 2).

Bend 502 can permit a portion 504 of hydraulic pipe fitting 200 to form a water-tight seal between the outer surface 222 of pipe 206 and inflatable conduit 300 proximate bend 502. A portion 504 of inflatable conduit 300 can become distorted in shape to accommodate gaps, spaces, or other imperfections between pipe 206 and housing 202 of hydraulic pipe fitting 200.

Figure 5B:
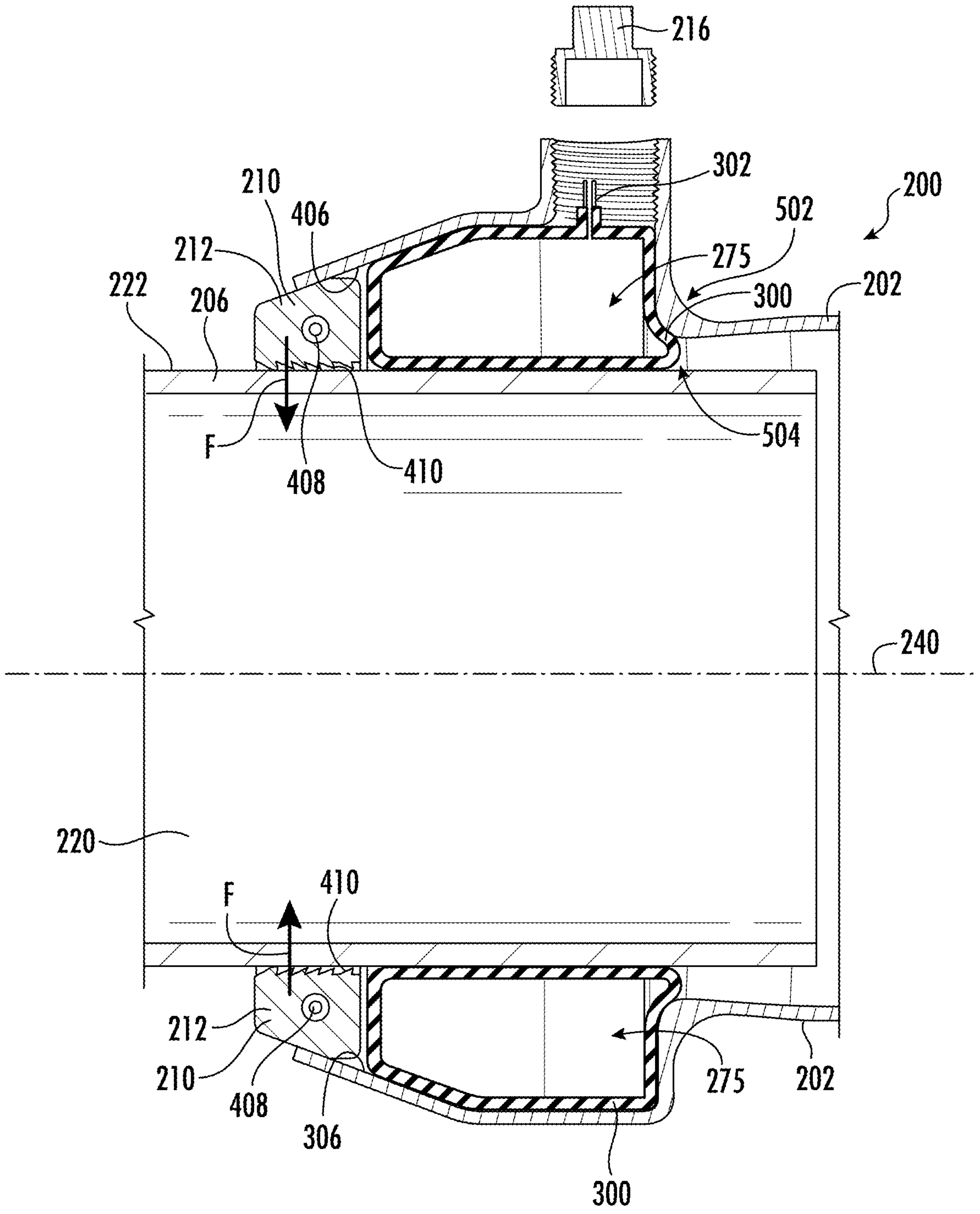
FIG. 5B is a cross-sectional view of the hydraulic fitting post-inflation of FIG. 3 with the gasket omitted, taken along line 5-5.

FIG. 5B is similar to FIG. 5A but shows an inflated aspect of the hydraulic pipe fitting 200 of FIG. 3 with the gasket 304 omitted. A comparison of FIG. 5A and FIG. 5B illustrates that inflatable conduit 304 can be used with or without gasket 304. Additionally, in various aspects, inflatable conduit 305 can be used with or without gripping mechanism 210. In some aspects, gasket 304 and/or gripping mechanism 210 can be removed from the assembly of the hydraulic fitting 200, and the inflatable conduit 300 can adjustably distort to fill the void created by removing one or more of the gasket 304 and/or gripping mechanism 210. Inflatable conduit 300, shown in FIG. 5B, can be a modified design configured to occupy the pace of the gasket 304. The gasket 304 has been omitted from this assembly. The inflatable conduit 300 can take various shapes, forms, and outlines, two examples of which are shown in FIGS. 5A and 5B. In this way, an inflatable conduit 300 can receive pressurized fluid (e.g., incompressible and/or compressible fluids such as water, air, or nitrogen) and, in the inflated configuration 275, can provide a fluid-tight seal (e.g., water-tight seal) and serve to secure hydraulic pipe fitting 200 to the outer surface 222 of pipe 206.

As described above, the gripping mechanism 210 can be removed from the hydraulic pipe fitting 200 in some aspects. Balanced forces and/or environment forces, such as pressure, can retain the inflatable conduit 300 within the hydraulic pipe fitting 200 without the gripping mechanism 210 (e.g., in the absence of gripping mechanism 210). In some aspects, the combination of balanced forces on gasket 304 and environmental forces, such as pressure exerted by the ground, can hold and/or secure the inflatable conduit 300 relative to the outer surface 222 of pipe 206. For example, in some aspects where the gripping mechanism 210 is removed, the inflatable conduit 300 can be securely held in place partly because the gasket 304 is balanced and partly because the pipe 206 and hydraulic pipe fitting 200 are buried. The ground pressure can pressurize and hold the pipe 206 and/or the hydraulic pipe fitting 200. In various examples, some combination of (1) the ground holds the inflatable conduit 300 relative to pipe 206 and (2) the balanced forces of the gasket 304 keep the hydraulic pipe fitting 200 still and secure relative to pipe 206.

In various aspects, inflatable conduit 300 and gasket 304 can be a single monolithic component. For example, a manufacturing process for inflatable conduit 300 can connect the outline of the gasket 304 directly to the inflatable conduit 304, creating a continuous or discontinuous wall thickness around the outside perimeter of the inflatable conduit 304, effectively integrating the gasket 304 into the inflatable conduit 300 in a single monolithic component. Similarly, the gripping mechanism 210 can be monolithic with the gasket 304 and/or inflatable conduit 300. For example, the gripping mechanism 210, gasket 304, and/or inflatable conduit 300 can be molded in a monolithic rubber component. In various aspects, the gripping mechanism 210, gasket 304, and/or inflatable conduit 300 can be coupled, connected, or attached. As used herein, monolithic connotes a single unitary and integral component. Coupled, connected, attached, and other synonyms refer to separate parts that are joined together and can function as a single unitary component (e.g., similar to a monolithic component). In general, a monolithic part can reduce components in the hydraulic pipe fitting 200 and, therefore, enhance assembly and installation. In some cases, attaching and coupling components can facilitate unitary and specific assemblies for a particular construction that can be varied, changed in place, and/or modified as needed. In various aspects, some parts can be integrated monolithically while other parts can be connected or attached. One of skill in the art would understand that no single arrangement of parts should be considered limiting on the disclosure.

In some aspects, the gripping mechanism 210 and/or gasket 304 can be omitted entirely. For example, the inflatable conduit 300 can provide the functions of both sealing the hydraulic pipe fitting 200 (e.g., in lieu of gasket 304) and mechanically securing the hydraulic pipe fitting 200 (e.g., in lieu of gripping mechanism 210) on the outer surface 222 of pipe 206.

Figure 6:
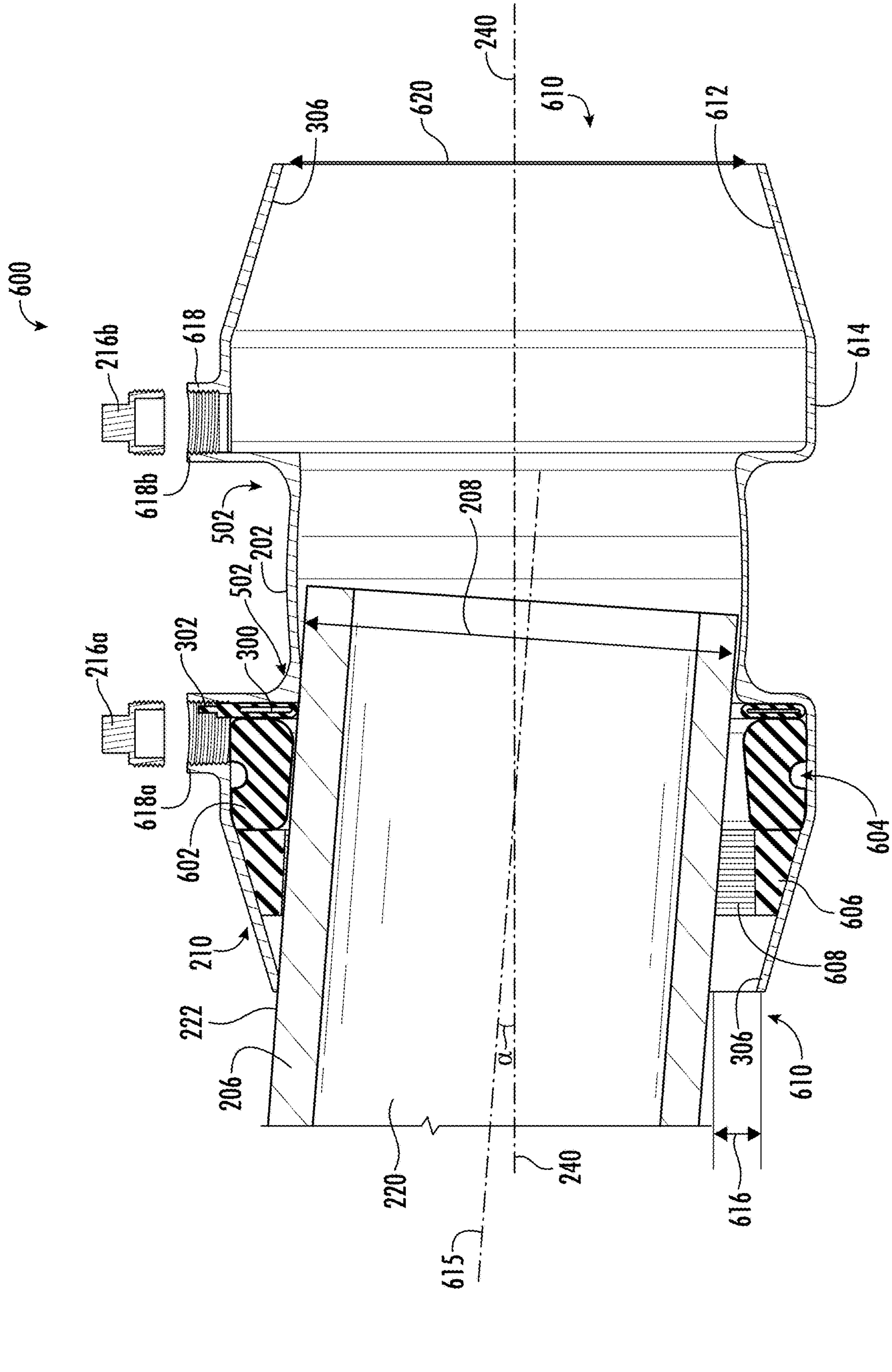
FIG. 6 is a cross-sectional view of another aspect of the hydraulic fitting comprising a vulcanized tooth set and a wide-angle body, in accordance with another aspect of the present disclosure.

FIG. 6 is a cross-sectional view of another aspect of a wide-angle hydraulic pipe fitting 600. Wide-angle hydraulic pipe fitting 600 can be substantially the same as or can be similar to hydraulic pipe fitting 200, except wide-angle hydraulic pipe fitting 600 can comprise the wide-mouth opening 610 with an inner diameter that exceeds the outer diameter 208 defining the outer surface 222 of pipe 206. In such aspects, a gap 616 can be formed between the outer surface 222 and wide-mouth opening 610. As discussed further below, gap 616 can be formed around the circumference (e.g., outer diameter 208) of pipe 206 installed coaxially. When pipe 206 is installed at an angle alpha ($\alpha$), gap 616 can vary around the circumference such that on one side of pipe 206, the gap 616 can be more significant than on the opposite side of pipe 206.

As used herein, wide-mouth opening 610 on a wide-angle hydraulic pipe fitting 600 can comprise an opening configured to receive pipe 206 with outer diameter 208 that can define gap 616 between the outer diameter 208 of the pipe 206 and the inner diameter 620 of the wide-mouth opening 610 when the central axis 615 of the pipe 206 is aligned with the central axis 240 of the wide-angle hydraulic pipe fitting 600. In various aspects, the outer surface 222 of pipe 206 can touch grip mechanism 210 on one side but not the opposite side when inserted at the angle alpha ($\alpha$) relative to the central axis 240 of the hydraulic pipe fitting 600. The wide-angle hydraulic pipe fitting 600 openings can facilitate installing two or more pipes 206, each forming a different angle $\alpha$ relative to housing 202.

Wide-angle hydraulic pipe fitting 600 can comprise inflatable conduit 300 adjacent to a notched gasket 602 comprising a notch 604, and a grip mechanism 606 comprising a tooth set 608 defining grip mechanism 210. In various aspects, grip mechanism 606 can comprise a solid tooth set 608 and/or can be a monolithic vulcanized rubber and/or elastomeric. The wide-angle hydraulic pipe fitting 600 can comprise wide-mouth opening 610 in housing 202 configured to receive a variety of sizes of pipe 206. Wide-mouth opening 610 can accommodate pipe 206 installed at various angles $\alpha$ within housing 202.

Housing 202 can comprise a sloped portion 612 and a cylindrical portion 614. The cylindrical portion 614 of housing 202 can extend between bend 502 and the sloped portion 612. When the inflatable conduit 300 is in the deflated configuration 250, cylindrical portion 614 can comprise the inflatable conduit 300 and/or notched gasket 602. When the inflatable conduit 300 is inflated, the notched gasket 602 can be compressed against the truncated cone 306 in the sloped portion of housing 202. As inflatable conduit 300 can expand, the notched gasket 602 and/or grip mechanism 606 can be compressed and distorted as they move through the truncated cone 306 and can compress grip mechanism 606 against pipe 206 to seal notched gasket 602 against outer surface 222. In various aspects, notch 604 can assist notched gasket 602 in deforming against housing 202 to form a fluid-tight seal against the outer surface 222 of pipe 206.

As shown, housing 202 can have identical left and right sides. The material, shape, composition, and/or structural dimensions can be mirrored on the right and left sides. In various aspects, housing 202 can comprise joined components or portions, for example, a left portion on the first end 204*a* and a right portion on the second end 204*b* that can be joined to make housing 202 (FIG. 2). Various fittings (e.g., those shown in FIG. 1) can be configured with a housing 202 comprising bend 502, inflatable conduit 300, gasket 304/602, and/or grip mechanism 210/606.

The bend 502 in housing 202 can support and comprise a valve inlet and/or a valve outlet 618, collectively called valve outlet 618. In some aspects, valve outlet 618 can receive inflation valve 302 and can support inflatable conduit 300 within housing 202. Valve outlet 618 can be threaded to receive a threaded valve cap 216. For example, a first valve outlet 618*a* can receive the first valve cap 216*a*, and the second valve outlet 618*b* can receive the second valve cap 216*b*.

Figure 7:
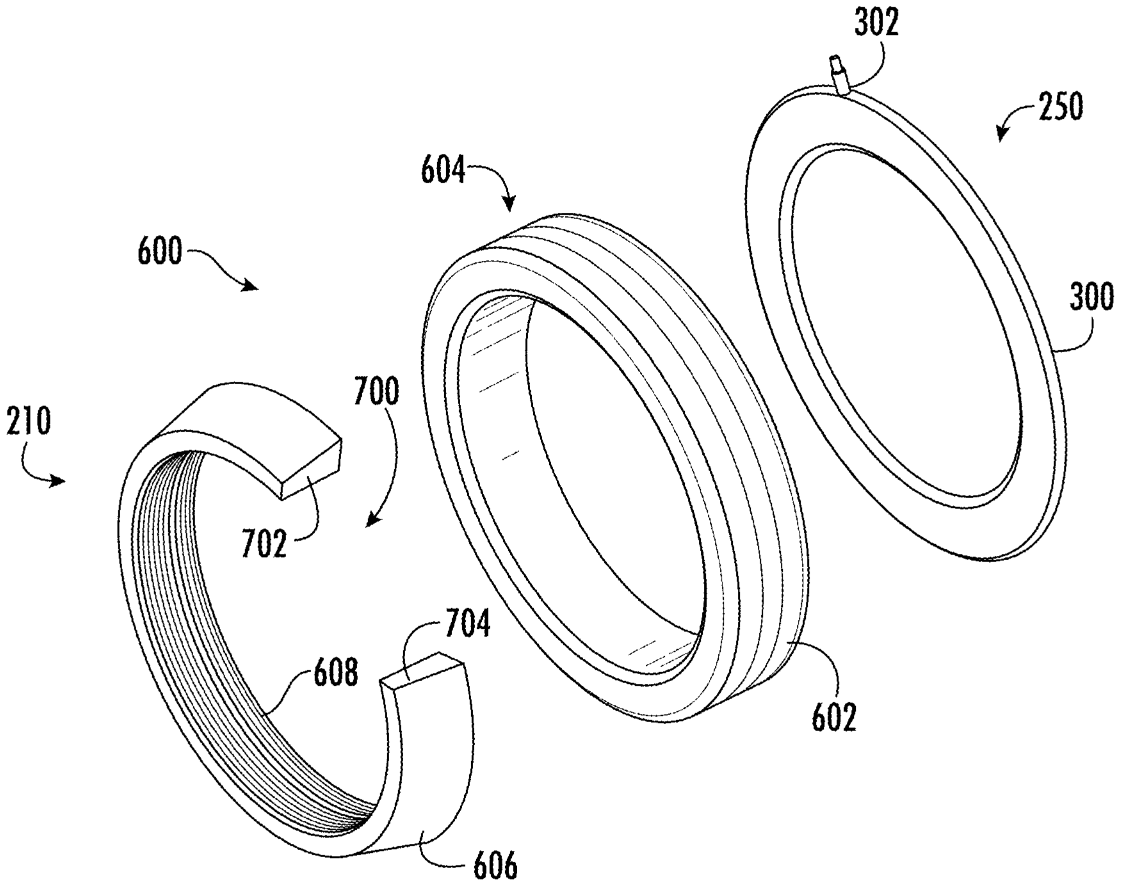
FIG. 7 is an exploded view of the valve assembly in FIG. 6.

FIG. 7 shows an exploded valve assembly 214 comprising inflatable conduit 300 that can be in the deflated configuration 250. Inflation valve 302 can be fluidly coupled to the inflatable conduit 300 and can couple to a pump to inflate inflatable conduit 300. Notched gasket 602 can comprise a notch 604 running circumferentially around notched gasket 602. In the aspect shown, notched gasket 602 can be a solid, non-hollow, monolithic component with notch 604 configured to facilitate the movement of notched gasket 602 in the axial direction 230 and compressed in the radial direction 225.

Grip mechanism 606 can be a vulcanized rubber, polymer, composite, or other material. Grip mechanism 606 can comprise a void 700 defined between a first end 702 and a second end 704 and configured to compress grip mechanism 606 as inflatable conduit 300 inflates and pushes notched gasket 602 and grip mechanism 606 in axial direction 230 and the truncated cone 306 compresses grip mechanism 606. Grip mechanism 606 can comprise teeth in tooth set 608 configured to grip pipe 206 and secure valve assembly 214 of housing 202 relative to pipe 206. As grip mechanism 606 compresses about pipe 206, void 700 can decrease. First end 702 and/or second end 704 can touch when inflatable conduit 300 can be fully inflated. This way, grip mechanism 606 can compress void 700 to grip pipe 206 within wide-angle hydraulic pipe fitting 600.

Figure 8:
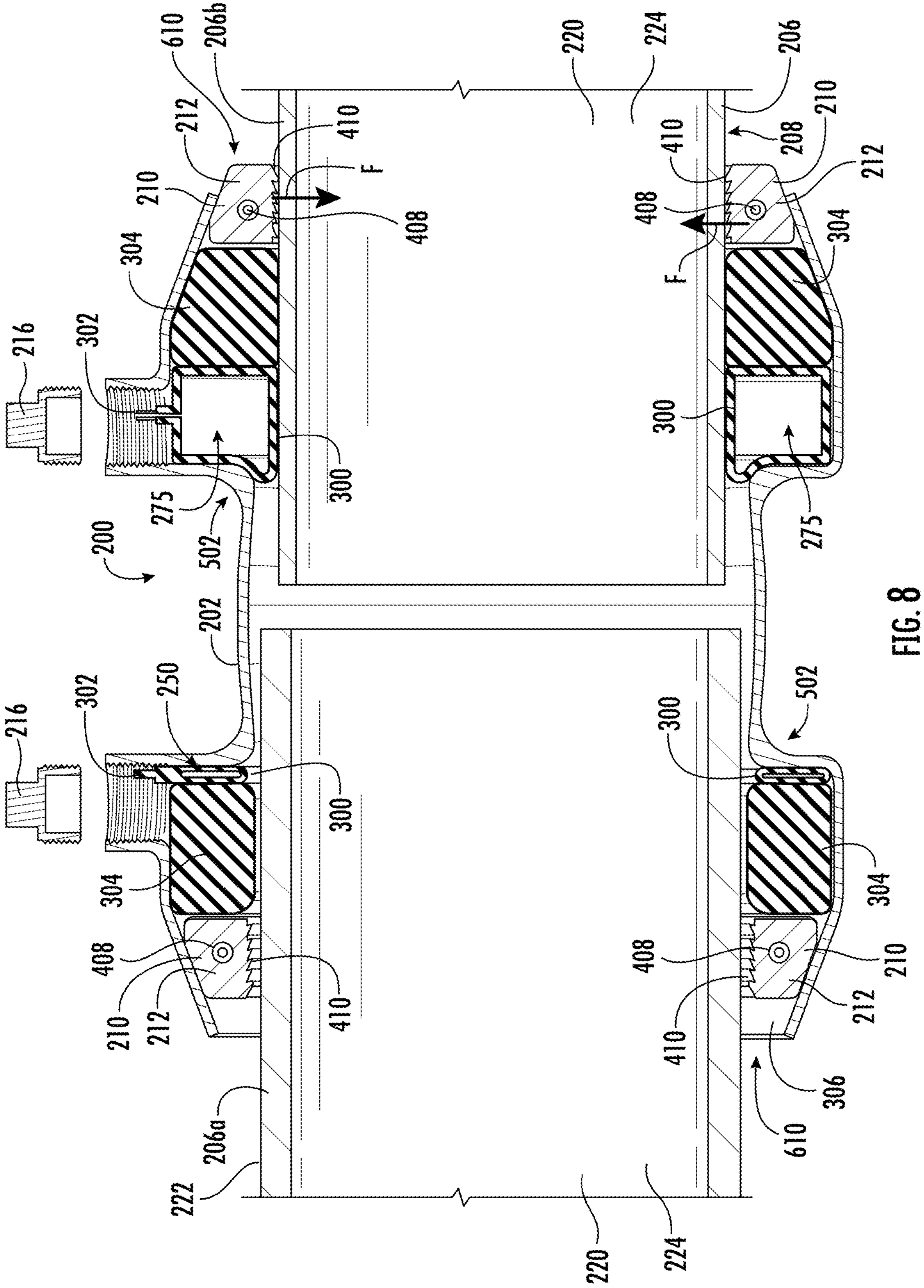
FIG. 8 is a comparison of the uninflated hydraulic fitting assembly on the left and the inflated hydraulic fitting assembly on the right.

FIG. 8 compares the fitting assembly (e.g., hydraulic pipe fitting 200) in the uninflated configuration on the left and the inflated configuration on the right. In some aspects, a pipe insert, stiffening device, or an insert stiffener can be used in conventional fitting assemblies. An insert stiffener can be used in flexible pipe connections, particularly in push-fit ball valves and fittings. Traditionally, insert stiffeners maintain roundness retention, provide structural support, and ensure grip ring engagement to ensure a reliable seal. However, insert stiffeners to support gasket 304 relative to pipe 206 can involve additional components to maintain pipe roundness and/or can cause leakages when installed on traditional fittings, particularly those involving HDPE pipes 206*b*. The difficulties related to the insert stiffeners can be avoided with the hydraulic pipe fitting 200 because gasket 304 can directly engage the outer surface 222 of pipe 206. In various aspects, the hydraulic pipe fitting 200 can omit the insert stiffener from the assembly, e.g., when installed on a smaller diameter pipe 206, such as HDPE pipe 206*b*.

In the discussion related to FIG. 8, gasket 304 and grip mechanism 210 are shown, but the following discussion equally applies to notched gasket 602 and/or grip mechanism 606. The description of gasket 304 and/or grip mechanism 210 is not limiting.

The discussion below likewise envisions and enables other aspects, e.g., with notched gasket 602 and/or grip mechanism 606.

For example, conventional stiffeners can be used to prevent the deformation of pipe 206 under pressure. However, conventional stiffeners can add significant cost and complexity to the installation process. Hydraulic pipe fittings 200 can comprise inflatable conduits 300 to create a fluid-tight seal between two or more mating components. For example, grips 212 can reinforce and/or support the seal formed between gasket 304 in housing 202 and the outer surface 222 of pipe 206. The installation and maintenance of conventional inflatable gaskets can be complex and can require specialized tools and expertise, increasing costs and downtime during repairs or replacements.

In the present aspect, inflatable conduit 300 can be positioned between bend 502 and gasket 304 so that a seal can be formed between gasket 304 and pipe 206 when inflatable conduit 300 can inflate and push grip 212. If the inflatable conduit 300 ruptures, breaks, or loses pressure, the grip 212 can remain compressed between truncated cone 306 of housing 202 and outer surface 222 of pipe 206, and the water-tight seal between gasket 304 and pipe 206 can be maintained. For example, once the inflatable conduit 300 positions the grip 212 and gasket 304, the fluid pressure can constrain gasket 304, and grip 212 can constrain housing 202. Because inflatable conduit 300 can push the gasket 304 and grip mechanism 210 to compress grips 212, once the grip mechanism 210 is positioned and the gasket 304 in housing 202 is pressurized, the seal between gasket 304 and pipe 206 can be maintained. In other words, the inflatable conduit 300 can position the gasket 304. Once the gasket 304 is positioned and pressurized within housing 202, the inflatable conduit 300 can be removed, and the gasket 304 can maintain the seal.

Once the normal force F is generated against pipe 206, the inflatable conduit 300 can be removed, deflated, or popped, and the water-tight seal can remain intact. Although the operator may not remove the inflatable conduit 300, the seal formed by gasket 304 between housing 202 and pipe 206 can be unaffected by ordinary wear and tear that can destroy inflatable conduit 300. Regardless of whether the inflatable conduit 300 survives long term, the hydraulic pipe fitting 200 can retain normal force F with the compressed grips 212 of grip mechanism 210 against pipe 206, and the seal can be maintained. Thus, the hydraulic pipe fitting 200 can reduce maintenance and labor costs.

Similarly, various fluids can be used to inflate hydraulic pipe fitting 200. For example, a compressible gaseous fluid, such as air, nitrogen, or carbon dioxide, can inflate inflatable conduit 300. For example, the gaseous fluid can be readily available to an operator technician in a service truck or a powered hand pump used to inflate inflatable conduit 300. In other aspects, an incompressible fluid, such as water, can inflate the inflatable conduit 00. The water can inflate the inflatable conduit 300 into the inflated configuration 275 and even burst the inflatable conduit 300. If the water used to inflate the inflatable conduit 300 bursts into the interior 224 of pipe 206, the water from the inner pipe surface 220 of pipe 206 can hold the gasket 304 and support grip 212 against pipe 206.

Inflatable conduit 300 can be pressurized from the deflated configuration 250 to the inflated configuration 275 to position gasket 304 and/or grip mechanism 210. Once gasket 304 and grip mechanism 210 are positioned, the normal force F can restrain gasket 304 and retain the fluid-tight seal without inflatable conduit 300. For example, when grip mechanism 210 and gasket 304 are positioned and hydraulic pipe fitting 200 is charged with water (or other fluid), the pressure of the fluid inside housing 202 can prevent gasket 304 from axial movement backward along the axial direction 230. The pressure can maintain the position of the gasket 304, and the position can maintain the fluid-tight seal. Similarly, grip mechanism 210 can continue restraining the hydraulic pipe fitting 200 relative to pipe 206 even when the inflatable conduit 300 is removed and/or in the deflated configuration 250. Because the fluid pressure within housing 202 can keep the gasket 304 and/or the grip mechanism 210 in position, hydraulic pipe fitting 200 can retain a fluid-tight seal even when inflatable conduit 300 is destroyed, e.g., pops or bursts.

In some aspects, a method can comprise inserting a pipe 206 at an angle into a wide-mouth opening 610 of hydraulic pipe fitting 200. When pipe 206 is inserted into the mouth of hydraulic pipe fitting 200, inflatable conduit 300 can be inflated to cause movement of grips 212 on grip mechanism 210 down the truncated cone 306 and exert a normal force F of grip mechanism 210 on pipe 206. Inflation can involve inserting water or a predetermined volume of incompressible fluid into the inflatable conduit 300. The normal force F can keep the grips 212 of grip mechanism 210 in place even when the inflatable conduit 300 may later be deflated. Grips 212 on grip mechanism 210 can comprise teeth 410 driven into the outer surface 222, e.g., when the normal force F compresses grips 212 against pipe 206. Normal force F can constrain the grips 212 of grip mechanism 210, which can prevent the movement of pipe 206 relative to the hydraulic pipe fitting 200.

Any feature described herein, without limitation to their particular arrangement, can comprise both functional and aesthetic elements, and any feature described as having functional aspects can have or define any one of several aesthetic designs without altering the respective functions of the various components. If aesthetic elements are shown in the drawings or possibly fall within the scope of broader claim elements without being directly claimed, such disclosure or claims should not be interpreted as assigning any function to such aesthetic elements, which may, therefore, be separately protectable.

The description enables teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible, can even be desirable in certain circumstances, and are part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth, e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials and processes and between different models, the tolerance for a particular measurement of a particular component can fall within a range of tolerances.

As used herein, the terms "optional" or "optionally" mean that the subsequently described event or circumstance may or may not occur and that the description comprises instances where said event or circumstance occurs and instances where it does not.

The word "or" as used herein means any one member of a particular list and also comprises any combination of members of that list. The phrase "at least one of A and B," as used herein, means "only A, only B, or both A and B," while the phrase "one of A and B" means "A or B."

As used herein, unless the context clearly dictates otherwise, the term "monolithic" in the description of a component means that the component is formed as a singular component that constitutes a single material without joints or seams.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the seat nearest to and occupied by a user of a seat; "rear" is that end of the seat that is opposite or distal the front; "left" is that which is to the left of or facing left from a person sitting in the seat and facing towards the front; and "right" is that which is to the right of or facing right from that same person while sitting in the seat and facing towards the front. "Horizontal" or "horizontal orientation" describes that which is in a plane extending from left to right and aligned with the horizon. "Vertical" or "vertical orientation" describes that which is in a plane angled at 90 degrees to the horizontal.

One should note that conditional language, such as, among others, "can," "could," "might," or "may," unless expressly stated otherwise, or otherwise understood within the context as used, is generally intended to convey that certain aspects include, while other aspects do not include, certain features, elements and/or steps. Thus, such conditional language is not generally intended to imply that features, elements, and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code that comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspects) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fitting assembly comprising:

a housing;

an inflatable conduit within the housing, the inflatable conduit configurable between a deflated configuration and an inflated configuration;

a gasket within the housing; and a grip mechanism at least partially extending beyond the housing, wherein the housing defines a bend and a truncated cone, wherein the truncated cone is a first truncated cone, the inflatable conduit is a first inflatable conduit, and the grip mechanism is a first grip mechanism, and wherein the fitting further comprises a second truncated cone, a second inflatable conduit, and a second grip mechanism on an opposite end from the first grip mechanism.

2. The fitting assembly of claim 1, wherein the housing is installed with the grip mechanism in the truncated cone and coupled to a high density polyethylene ("HDPE") pipe.

3. The fitting assembly of claim 1, wherein the inflatable conduit pushes the grip mechanism in an axial direction, and the truncated cone compresses the grip mechanism in a radial direction towards a central axis of the housing.

4. The fitting assembly of claim 1, wherein the inflatable conduit defines a hydraulic pressure, wherein when the inflatable conduit is in the inflated configuration at the hydraulic pressure, wherein the grip mechanism moves in an axial direction, and the truncated cone compresses the grip mechanism and defines a predetermined normal force on the grip mechanism when a specified pipe is installed in the housing.

5. The fitting assembly of claim 1, wherein in the deflated configuration, a gripping frictional force defined by the grip mechanism is less than the gripping frictional force defined by the grip mechanism when the inflatable conduit is in the inflated configuration.

6. The fitting assembly of claim 1, wherein water inflates the inflatable conduit from the deflated configuration to the inflated configuration.

7. The fitting assembly of claim 1, wherein air inflates the inflatable conduit from the deflated configuration to the inflated configuration.

8. The fitting assembly of claim 1, wherein the housing is a monolithic cast structure, the inflatable conduit is a rubber tube, and the gasket is separate from the inflatable conduit.

9. The fitting assembly of claim 8, wherein the housing comprises a wide-mouth opening defining a gap between a truncated cone and teeth on the grip mechanism.

10. A fitting comprising:

a housing defining a truncated cone;

an inflatable conduit within the housing, the inflatable conduit configurable between a deflated configuration and an inflated configuration;

a grip mechanism at least partially within the truncated cone of the housing; and a rubber gasket, wherein the inflatable conduit compresses the rubber gasket within the truncated cone and against a pipe to create a fluid-tight seal.

11. The fitting of claim 10, wherein the housing is a monolithic cast structure and the inflatable conduit is a rubber tube.

12. The fitting of claim 10, wherein the fitting and the grip mechanism comprise metal, and the grip mechanism comprises teeth configured to compress an outer surface of a high density polyethylene ("HDPE") pipe to secure the fitting relative to the HDPE pipe.

13. The fitting of claim 10, wherein the truncated cone is a first truncated cone on a first end of the housing, the inflatable conduit is a first inflatable conduit, and the grip mechanism is a first grip mechanism, and wherein the fitting further comprises a second truncated cone, a second inflatable conduit, and a second grip mechanism on an opposite end from the first grip mechanism.

14. The fitting of claim 13, wherein the first inflatable conduit compresses a first gasket against a first pipe and a second pipe is inserted into the opposite end of the fitting, and the second inflatable conduit compresses a second gasket against the second pipe at the opposite end.

* * * * *